United States Patent
Suzuki

(10) Patent No.: US 7,137,733 B2
(45) Date of Patent: Nov. 21, 2006

(54) STARTUP DISPLAY DEVICE

(75) Inventor: Hitoshi Suzuki, Tokyo (JP)

(73) Assignee: Hiromori Corporation, Tokyo (JP)

( * ) Notice: Subject to any disclaimer, the term of this patent is extended or adjusted under 35 U.S.C. 154(b) by 214 days.

(21) Appl. No.: 10/854,958

(22) Filed: May 27, 2004

(65) Prior Publication Data

US 2005/0265130 A1 Dec. 1, 2005

(51) Int. Cl.
*G04B 37/00* (2006.01)

(52) U.S. Cl. ........................ 368/316; 368/283; 368/276

(58) Field of Classification Search ............... 368/276, 368/278, 299–300, 311–313, 283, 316–317, 368/88; 248/114–116; 349/59
See application file for complete search history.

(56) References Cited

U.S. PATENT DOCUMENTS

| D377,648 S | * | 1/1997 | Young ........................ D14/136 |
| D424,050 S | * | 5/2000 | Sakamoto et al. ......... D14/136 |
| 6,443,615 B1 | * | 9/2002 | Chan .......................... 368/316 |

* cited by examiner

*Primary Examiner*—Kamand Cuneo
*Assistant Examiner*—Sean Kayes
(74) *Attorney, Agent, or Firm*—Dilworth & Barrese LLP

(57) ABSTRACT

The present invention is directed to a startup display device which can be properly oriented for viewing by simply releasing a cover on a main body containing display contents. The device then automatically moves in two directions, first upwardly and then laterally onto one side, thereby orienting the contents therein for display.

20 Claims, 5 Drawing Sheets

STARTUP DISPLAY DEVICE

BACKGROUND OF THE INVENTION

The present invention is directed to a new and improved startup (popup) display device. More particularly, the present invention is direction to a startup display device in which contents therein can be correctly oriented for display by simply unfastening (unsnapping) a cover over the contents, with the device then automatically assuming proper orientation without need for further intervention by a user.

There is a long-felt need to provide a startup display device which is compact, requiring little space for locating and suitable for easy carrying. There is furthermore a need to explicitly facilitate opening and orientation of a startup display device to expedite proper orientation for viewing as smoothly and in as little time as possible. This need has grown due to the various sophisticated mechanisms which can now be successfully incorporated into such startup display devices, e.g., computers, palm pilots, etc. Ideally, these devices should be opened and oriented for viewing with minimal effort, especially for individuals who might normally encounter difficulty in doing so, e.g., disabled persons. Furthermore, these devices should also provide attractive appearance to one who must learn to operate or becoming familiar with the contents of such devices, e.g., a child learning to tell time.

SUMMARY OF THE INVENTION

Accordingly, it is an object of the present invention to provide an improved startup display device which is compact, easy to carry, and at the same time can be rapidly and reliably opened in facilitated manner.

It is also an object of the present invention to improve opening and display of a startup display device by one who might normally encounter difficulty in doing so, e.g., a disabled person.

It is a further object of the present invention, to facilitate use and functions of the features contained within and ultimately displayed by the startup display device, e.g., by a child, to encourage familiarity with operating such features.

These and other objects are attained by the present invention which is directed to a startup display device having a main body containing a feature-displaying portion, a cover structured and arranged to cover the main body and feature-displaying portion in closed condition, and a hinge structured and arranged to resiliently couple the main body and cover together. The main body and cover are resiliently coupled together along the hinge such that when a side of the main body opposite the feature-displaying portion and cover is placed upon a surface and the cover is then released from covering the feature-displaying portion of the main body, resilient action causes the cover to rotate a discrete angle with respect to the main body and the device to rise. Then, after the cover has rotated through the discrete angle, the device is structured and arranged to turn or incline in a substantially lateral direction and stably rest upon the surface in opened condition, thus clearly, unobtrusively displaying the contents contained within the main body.

The hinge mechanism generally contains a coil spring arranged to bias the cover in opened condition towards the discrete angle of rotation, after the cover is released from covering the feature-displaying portion of the main body. Means for fastening the cover to the main body to cover the feature-displaying portion are generally provided at an end of the cover opposite the hinge mechanism. In this regard, an end of the cover opposite the hinge mechanism can be curved to facilitate tipping or tilting of the entire device to one side after the cover has rotated through the discrete angle.

The main body itself is structured and arranged to turn or tilt to one lateral side after the cover has rotated through the maximum angle about the hinge mechanism, or even before the cover has rotated entirely through this maximum angle. This is attained by offsetting the center of gravity of the main body such that after the main body is tilted upwardly a certain distance by the rotating cover, the main body automatically leans or tilts to one lateral side and ultimately stably rests upon that side on the surface. The center of gravity of the main body can be offset by strategically locating a weight within the main body and/or asymmetrically-shaping the main body.

The cover itself then forms a rearwardly extending support or brace to maintain the startup display device in this lateral position where the properly-oriented feature-displaying portion can be easily viewed. Protruding ribs and/or a grounding support surface are provided on the backside of the main body opposite the exposed feature-displaying portion to facilitate tipping of the main body to one side as the released cover rotates about the hinge mechanism.

The feature-displaying portion within the main body can contain any number of mechanisms or functions, e.g., a timepiece or clock, thermometer, hygrometer, picture or photograph frame, barometer, meterorograph, radio with display dial therefor, calendar, timetable, calculator or computer. The rapid, smooth release, opening and display orientation of the inventive startup display device enhances presentation and attractiveness of the contents being displayed. This is especially useful to encourage use of and familiarity with the contents being displayed, e.g., by a child. Furthermore, the inventive display device, providing smooth opening by moving in two normal directions, facilitates use by one who might normally encounter difficulty in opening and orienting such startup display devices, e.g., an elderly or disabled person.

BRIEF DESCRIPTION OF THE DRAWINGS

The present invention will be described in greater detail with reference to the accompanying drawings in which.

DESCRIPTION OF THE PREFERRED EMBODIMENTS

Figure 1:
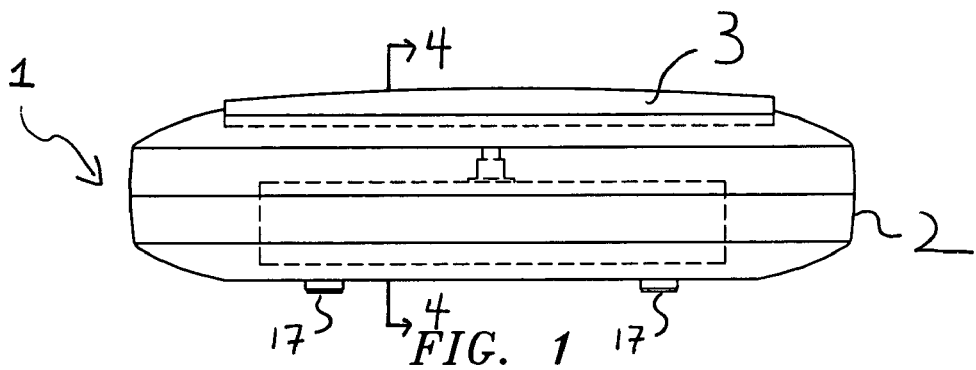
FIG. 1 illustrates a front elevational view of the startup display device in accordance with the present invention, in closed condition.
Figure 2:
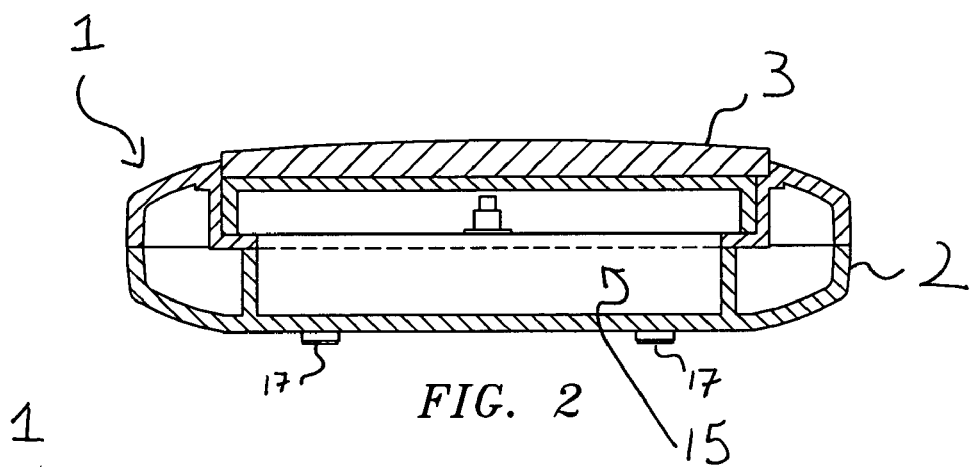
FIG. 2 illustrates a front sectional view of the device shown in FIG. 1, in the direction of arrows 2—2 in FIG. 3.
Figure 3:
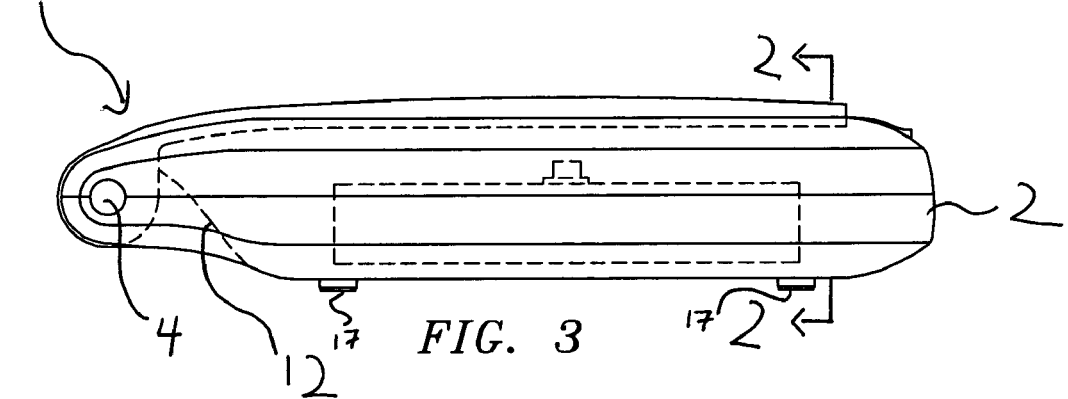
FIG. 3 illustrates a left side elevational view of the device shown in FIGS. 1 and 2.
Figure 4:
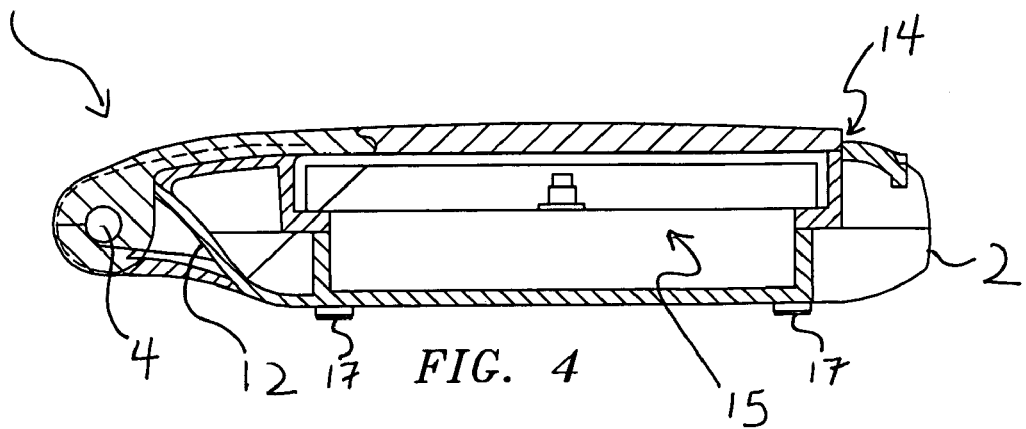
FIG. 4 illustrates a left side sectional view of the device shown in FIGS. 1–3 in the direction of arrows 4—4 in FIG. 1.

Referring to the drawings in the present application, the inventive startup or popup display device 1 comprises a main body 2 having a well 15 for receiving a separately-functioning feature such as a clock or timepiece (operating, e.g., with a watch battery), a thermometer, a hygrometer, a picture or photograph frame, a barometer, a meteorograph, a radio in turn having a display such as a dial, a calendar, a timetable, a calculator, or even a computer such as a palm pilot. A cover 3 is resiliently and rotatably coupled to one end of the main body 2 about a hinge mechanism 4.

Figure 5:
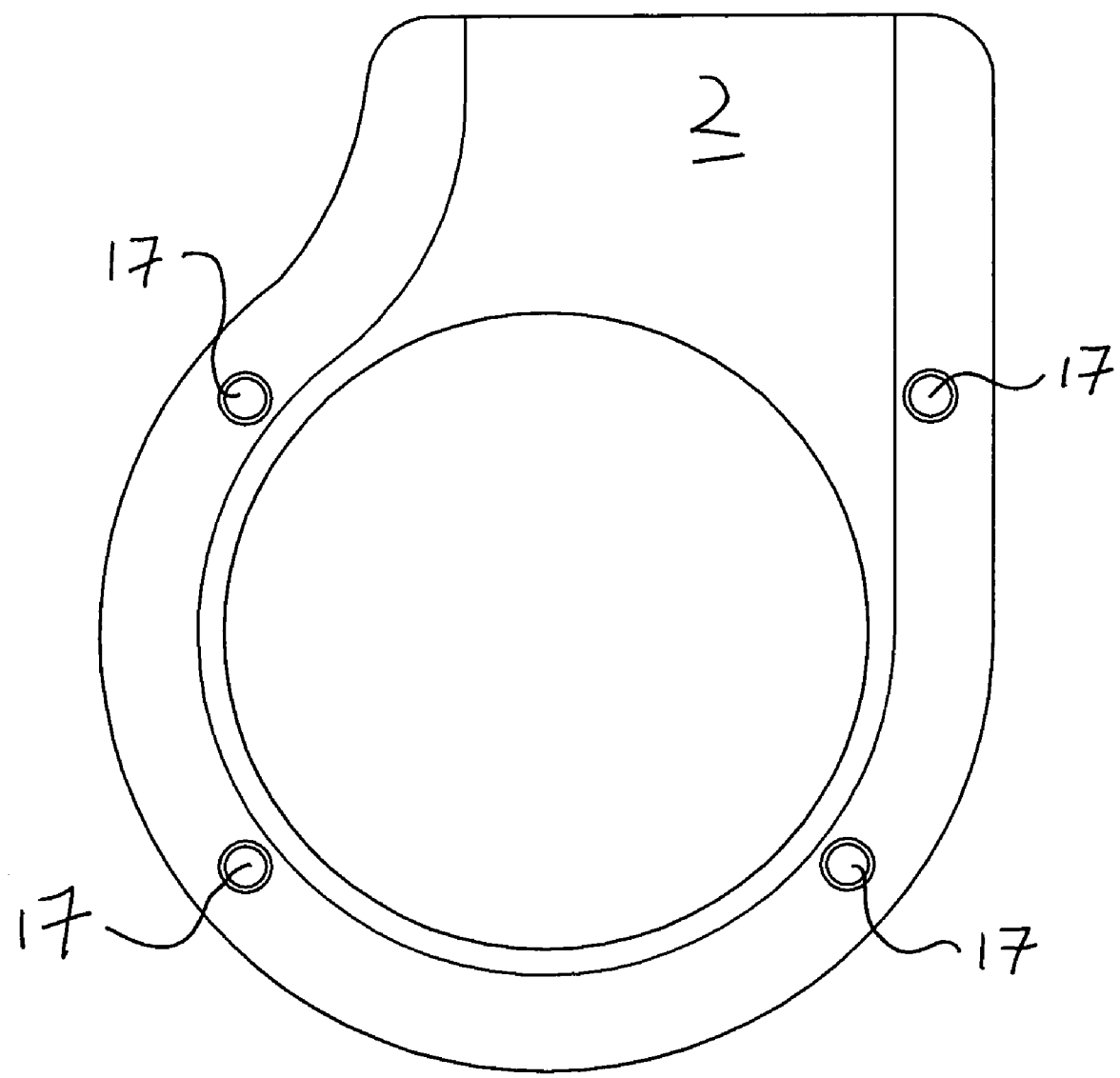
FIG. 5 illustrates a bottom plan view of the device shown in FIGS. 1–4.
Figure 6:
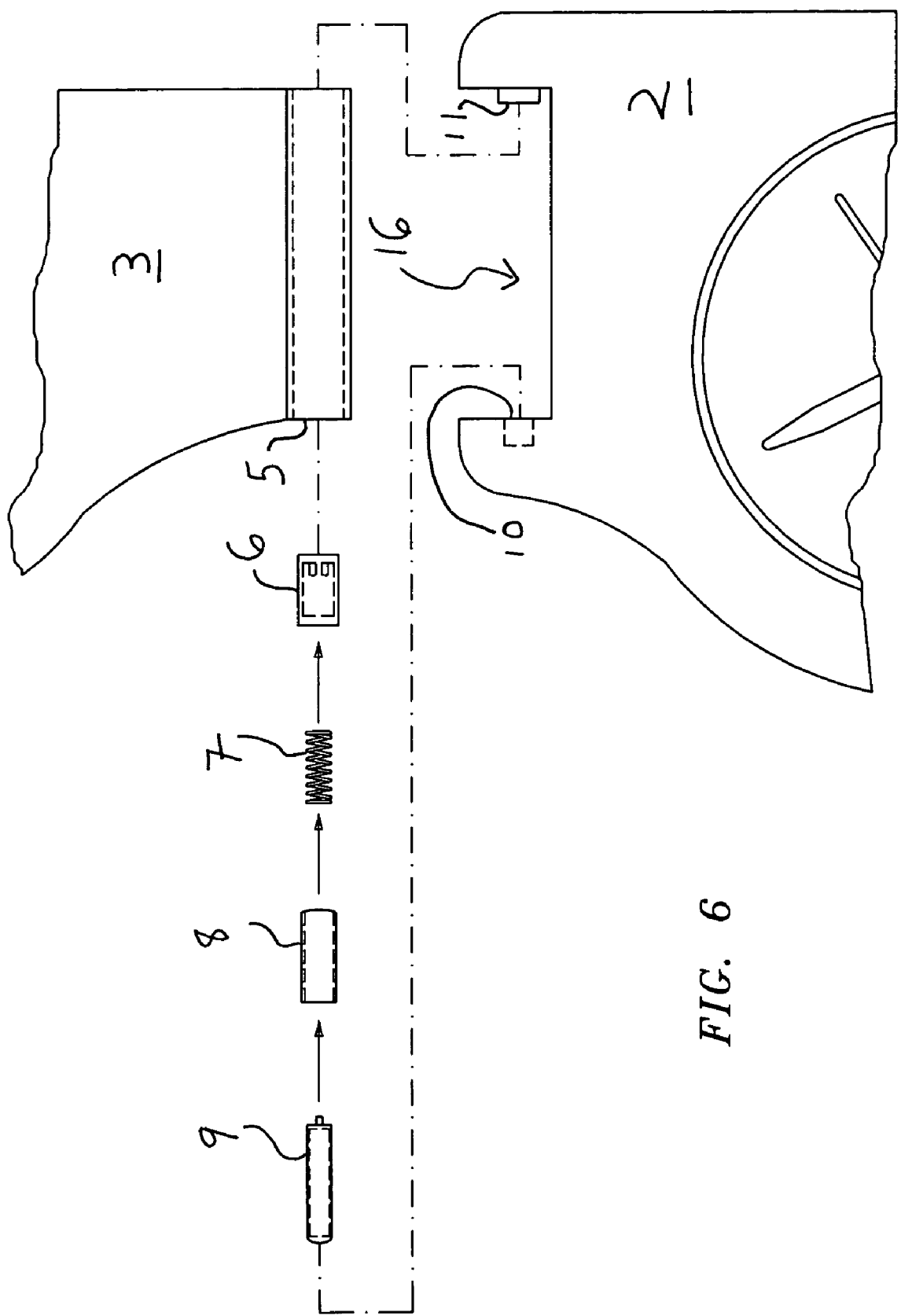
FIG. 6 illustrates a partially cutaway, exploded schematic view showing assembly of the device in accordance with the present invention.
Figure 7:
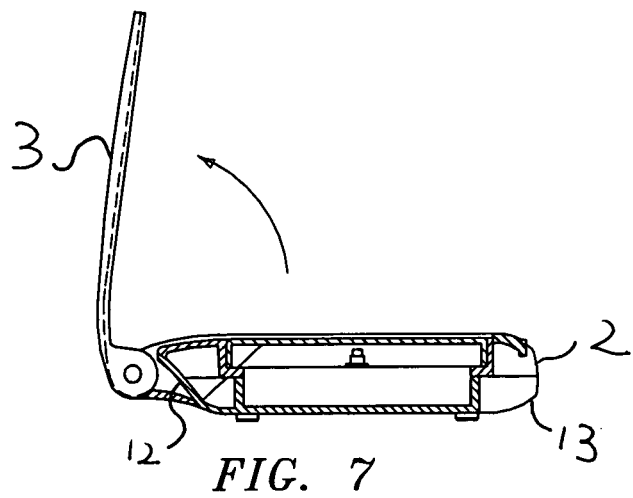
FIGS. 7–10 illustrate a series of schematic sectional views, similar to FIG. 4 and illustrating various stages in opening of the inventive device.
Figure 8:
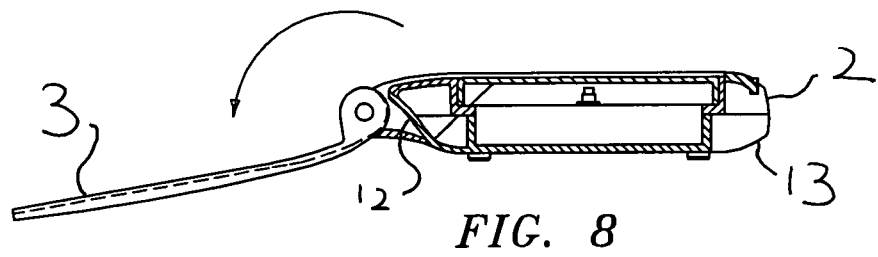
Figure 9:
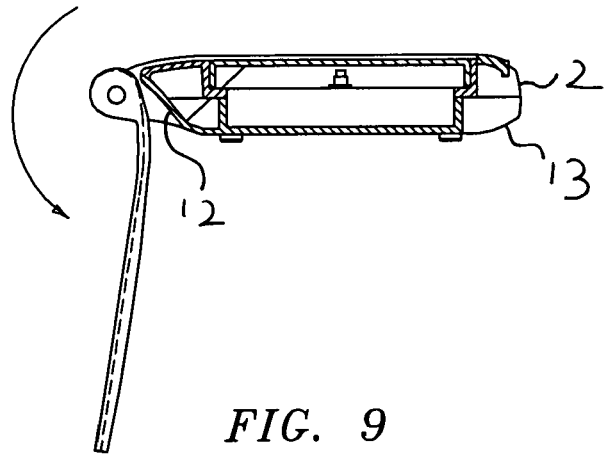

More specifically, the hinge mechanism, as illustrated in FIG. 6, comprises tubular hinge receptacle 5 positioned at one end of the cover 3, a spring-containing portion 6, the spring 7 itself, e.g., a coil spring, a hinge sheath 8 and a hinge shaft 9 which is generally covered with oil as indicated by the dashed lines about the circumference of the shaft 9. The sheath 8 and spring containing portion 6 together form a hinge cylinder The hinge components 6–9 are assembled together in the direction of the arrows in FIG. 5 and inserted into the receptacle 5 in the direction of the dash-dot line in this figure.

Then, the components 6–9 are pressed together, e.g., by hand, once seated within the receptacle 5 at one end of the cover 3, to allow the end of the cover 3 to be inserted within the concomitant recess 16 at the receiving end of the main body 2, so projection 11 of the main body 2 can seat within the tubular receptacle 5 in the direction of the dash-dot line. Then, once the cover 3 with hinge components 6–9 contained within receptacle 5 is properly seated within recess 16 of main body 2, pressure holding hinge components 6–9 together is simply released to allow the end of shaft 9 opposite spring 7 to seat within well 10 provided within a wall of the recess 16 of the main body 2 in the direction of the dash-dot line, due to outward biasing of the coil spring 7. Therefore, the hinge mechanism 4 will securely couple the main body 2 and cover 3 together.

Figure 10:
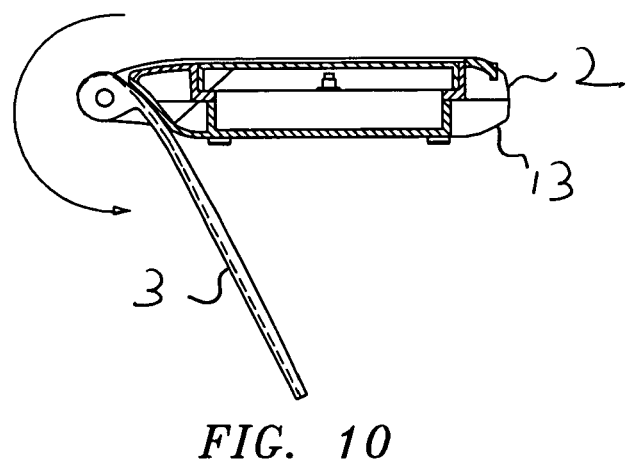

Additionally, the hinge mechanism 4 explicitly couples the main body 2 and cover 3 together, to outwardly bias the cover 3 from the main body 2 to open position, as best seen, e.g., in FIG. 10. Furthermore rotation of the cover 3 about the hinge mechanism 4 is explicitly blocked by a concavely-shaped portion 12 of a rear surface of the main body 3, i.e., opposite the surface displaying the feature such as a timepiece, etc. and which had been covered in the closed positions illustrated, e.g., in FIGS. 1–4. A fastening mechanism, e.g., a snap-fitting fastener 14, can be provided to secure an end of the cover 3 opposite the hinge mechanism 4 to the main body 2, to retain the cover 3 in closed position over the main body 2 until release. This fastening mechanism can be provided in any of a variety of known forms, e.g., a tongue and groove catch, a lip of the main body structured to resiliently overhang an end of the cover 3 opposite the hinge mechanism 4, etc.

Figure 11:
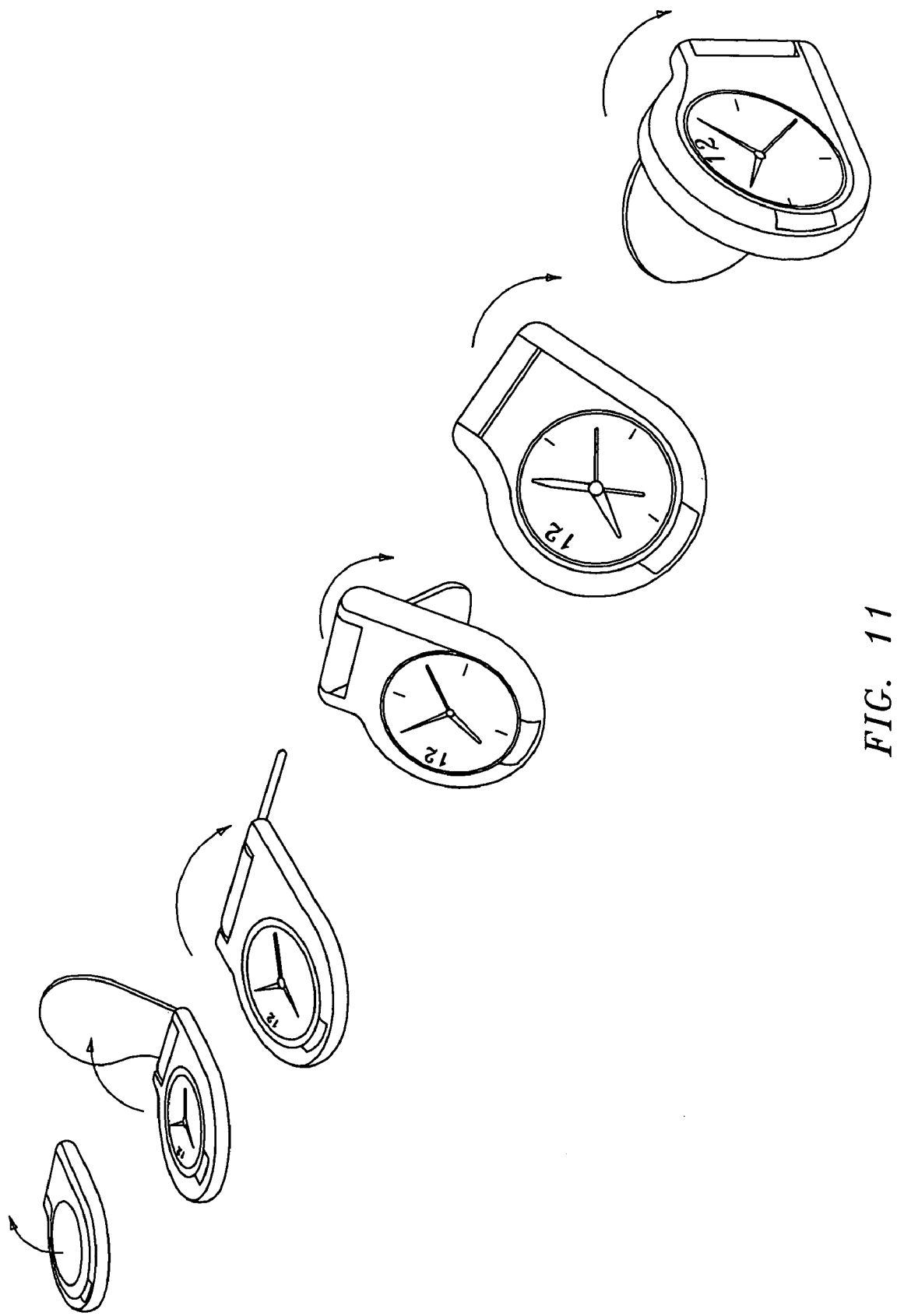
FIG. 11 schematically illustrates a series of perspective views, similar to FIGS. 7–10 and illustrating opening, turning and resting of the inventive display device in accordance with the present invention.

At the same time, an area 13 of a back surface of the main body 2 at an end thereof opposite the hinge mechanism 4 forms a support or balancing portion for the main body 2 as it is opened, as will be described further infra. The main body 2 itself possesses an asymmetrical or offset center of gravity which impacts upon opening of the device 1 as also described further infra. In this regard, the center of gravity can be offset in the main body 2 by incorporating weights within the main body 2, should a symmetrical outward appearance of the device 2 upon opening still be desired. However, the center of gravity can also be offset by skewing the shape of the main body 2 to be asymmetrical and/or possess a bulge at one side thereof as best seen in FIGS. 5 and 11. The back surface of the main body 2 can be provided with a series of protruding ribs 17 which support the main body 2 upon a surface in closed condition as shown, e.g., in FIGS. 1–5. These ribs 17 are generally symmetrically arranged upon the back surface of the main body 2 as shown. Protruding receptacles for receiving concomitant rubber supports can be molded together with the main body 2.

Providing a main body 2 have these discrete shapes or forms, provides rapid, smooth, stable and reliable opening and orienting of the display device to be observed upon release of the cover 3, in the following manner. Referring to FIGS. 7–11, after the resilient catch 14 at the top front side of the main body 2 is released, e.g., by depressing cover 3, then if the main body 3 is resting upon the rear side opposite the cover 3 (as shown in FIGS. 1–4), the cover 3 immediately rotates about hinge mechanism 4 in the direction of the counterclockwise arrow in FIG. 7 due to action of coil spring 7. As the cover 3 rotates about the hinge mechanism 4, the opposite end of the cover 3 comes into contact with the ground and raises the device to a position best seen in FIG. 10 where the hinge mechanism 4 essentially forms the apex of a peak defined by the main body 2 and cover 3.

As can be seen in these figures, the main body 2 rapidly rises at one end thereof, with the surface 13 at the back of the main body 2 supporting and helping to balance the main body 2 as the cover 3 rotates about substantially horizontally-extending hinge mechanism 4 due to the resilient action. The rear surface 12 of the main body 2 adjacent the hinge mechanism 4 is concavely curved to complementary receive a bowed top side of the rotating cover 3 as best seen in FIG. 10. At the same time, positioning of this surface 12 stops the cover 3 from rotating further, i.e., limits the cover 3 to a discrete angle of rotation beyond which the cover 3 cannot rotate. This allows cover 3 to rotate about hinge mechanism 4 after release from the catch 14 through an angle greater than 180 degrees and even 270 degrees, but not all the way to 360 degrees. An end of the cover 3 opposite the hinge mechanism is curved to facilitate ultimate orientation of the inventive device as described further with reference to FIG. 11 infra.

As the device 1 rises due to resilient action of the hinge mechanism 4 upon the cover 3, the main body 2 is lifted while being supported upon the at least one rib 17 and/or edge 13 of the main body opposite the hinge mechanism 4. As the device 1 is lifted as shown, the offset center of gravity will eventually cause the device 1 to fall to one side, stably orienting the feature-displaying portion of the device 10 in upright position. The main body 2 can be arranged to laterally tip even before the cover 3 reaches its maximum angle of rotation about hinge mechanism 4, as shown in FIG. 10. In this regard, the ribs 17 can be positioned to maintain position of the main body 2 temporarily as the cover 3 begins to rotate, to prevent the main body 2 from immediately rotating and/or tilting upon release of the cover 3.

A grounding portion can be attached in protruding form adjacent the flat back surface and curved edge 13 of the main body 2 to guide tipping or tilting along curved circumferential edge 13, i.e., with the main body 2 laterally rotating about circumferential edge 13 to roll in the proper lateral direction. The curved end of the cover 3 helps guide the main body 2 as it is raised upwardly to be "unstable," i.e., allow the offset center of gravity to take control and tilt the device 1 in the properly-oriented direction. In this regard, the cover 3 ultimately forms a brace for stably supporting the device 1 in upright position as best seen in the last view of FIG. 11. Therefore, the combined features of the present invention, notably the specific shapes of the individual components forming the inventive startup display device, contribute to operating the display device, namely the various stages in the opening thereof as illustrated in FIG. 11, to provide smooth, stable and reliable opening to properly display the contents of the device 1.

The device 1 is illustrated in the various figures as possessing a timepiece or clock. However, the device 1 can contain other functions in accordance with the present invention as described above. Furthermore, the components forming the inventive startup device can be formed from any conventionally available material, e.g., metallic material (in the case of the coil spring 7) or synthetic material in the case of the other components, namely the main body 2 and cover 3. The main body 2 and appendages can be formed from hard plastic while the cover 3 can be formed from at least partially flexible plastic to allow for both snapping coupling to and release from fastening mechanism 14 and support of the main body 2 as it rises upon release as shown in FIG. 11.

The preceding description of the present invention is merely exemplary and is not intended to limit the scope thereof in any way.

What is claimed is:

1. A startup display device (1), having
   a main body (2) containing a feature-displaying portion (15),
   a cover (3) structured and arranged to cover said main body (2) and feature-displaying portion (15) in closed condition, and
   a hinge (4) structured and arranged to resiliently couple said main body (2) and cover (3) together,
   said main body (2) and cover (3) resiliently coupled together along said hinge (4) such that when a side of said main body (2) opposite said feature-displaying portion (15) and cover (3) is placed upon a surface and said cover (3) released from covering the feature-displaying portion (15) of said main body (2), resilient action causes said cover (3) to automatically rotate a discrete angle with respect to said main body (2) and said entire device (1) including said main body (2) to rise, and
   after said cover (3) has rotated the discrete angle, said device (1) is structured and arranged to automatically turn or incline in a substantially lateral direction and stably rest upon the surface in opened condition.

2. The device (1) of claim 1, additionally comprising
   a spring (7) positioned along said hinge (4) to bias said cover (3) and main body (2) into the opened position.

3. The device (1) of claim 2, wherein said hinge (4) comprises
   a tubular sheath (8) structured and arranged to encompass said spring (7),
   a spring-containing portion (6) structured and arranged for containing said spring (7) and sheath (8), with said spring (7) being a coil spring and structured and arranged to seat in said spring-containing portion (6), said sheath (8) and spring-containing portion (6) together forming a hinge cylinder, and
   a hinge shaft (9) structured and arranged to fit into said sheath portion (8) and having an inner end arranged to cooperate with said coil spring (7) and outer end arranged to be pivotally mounted upon a side of said main body (2).

4. The device (1) of claim 1, additionally comprising
   means (14) for fastening said cover (3) to said main body (2) at ends thereof substantially opposite said hinge (4) to keep said cover (3) in the closed condition.

5. The device (1) of claim 4, wherein said fastening means (14) are constituted by a fastener positioned upon the end of said main body (2) opposite said hinge (4).

6. The device (1) of claim 1, wherein said main body (2) is structured and arranged to possess an offset set center of gravity such that after said cover (3) has rotated through the discrete angle, the offset center of gravity causes said main body (2) to turn or incline in the lateral direction.

7. The device (1) of claim 6, wherein said main body (2) comprises at least one weighted portion to offset the center of gravity.

8. The device (1) of claim 7, additionally comprising at least one weight situated within said main body (2) to offset the center of gravity and cause said main body (2) to turn or incline in the substantially lateral direction and avoid interfering with rotation of said cover (3) through the discrete angle.

9. The device (1) of claim 6, wherein said main body (2) is asymmetrically shaped to offset the center of gravity.

10. The device (1) of claim 9, wherein said main body (2) is asymmetrically-shaped to cause said main body (2) to turn or incline in the substantially lateral direction and avoid interfering with rotation of said cover (3) through the discrete angle.

11. The device 1 of claim 1, wherein said hinge (4) is structured and arranged to couple said main body (2) and cover (3) at a head end of said main body (2) and base end of said cover (3), and
    a back surface (12) of said main body (2) opposite said feature-displaying portion (15) being substantially concavely-curved at or near the head end of said main body (2) to complementary receive a corresponding contacting surface of said cover (3) and define, together with said cover (3), the discrete angle beyond which said cover (3) is prevented from further rotating.

12. The device (1) of claim 11, additionally comprising at least one of
    (i) at least one protruding rib (17), and
    (ii) a grounding portion,
    positioned upon the back surface of said main body (2) at an end of said main body (2) opposite the head end and structured and arranged to support said main body (2) upon the resting surface as said cover (3) rotates under resilient action of said hinge (4) and main body (2) rises upwardly at the head end thereof.

13. The device (1) of claim 12, comprising (i) said at least one rib (17) which is structured and arranged to serve as a support for said main body (2) as said cover (3) rotates and raises said main body (2), and with said back surface (12) of said main body (2) preventing rotation of said cover (3) with respect to said main body (2) beyond the discrete angle.

14. The device (1) of claim 13, comprising (i) at least three of said ribs (17) symmetrically-positioned upon the back surface of said main body (2).

15. The device (1) of claim 1, wherein said hinge (4) is structured and arranged to couple said main body (2) and cover (3) at a head end of said main body (2) and base end of said cover (3), and additionally comprising at least one of
    (i) at least one protruding rib (17), and
    (ii) a grounding portion,
    positioned upon a back surface of said main body (2) opposite said feature-displaying portion and at an end of said main body (2) opposite the head end thereof, said grounding portion structured and arranged to support said main body (2) upon the resting surface as said cover (3) rotates under resilient action of said hinge (4) and main body (2) rises upwardly at the head end thereof.

16. The device (1) of claim 15, comprising (i) said at least one rib (17) which is structured and arranged to serve as a support for said main body (2) as said cover (3) rotates and raises said main body (2), and with said back surface of said main body (2) preventing rotation of said cover (3) with respect to said main body (2) beyond the discrete angle.

17. The device (1) of claim 16, comprising (i) at least three of said ribs (17) symmetrically-positioned upon the back surface of said main body (2).

18. The device (1) of claim 1, being structured and arranged to contain and display the feature of at least one of a timepiece or clock, thermometer, hygrometer, picture or photograph frame, barometer, meteorograph, radio with display dial therefor, calendar, timetable, calculator, and computer.

19. The device (1) of claim 16, structured and arranged to contain and display the clock or timepiece.

20. The device (1) of claim 1, wherein the discrete angle is greater than 270 degrees but not 360 degrees.

* * * * *